United States Patent [19]

Giesen et al.

[11] 4,107,036

[45] Aug. 15, 1978

[54] SEPARATION OF CARBON BLACK BY LIQUID HYDROCARBONS

[75] Inventors: Heinz Giesen; Josef Hibbel; Willi Jansen; Sebastian Speth, all of Oberhausen, Germany

[73] Assignee: Ruhrchemie Aktiengesellschaft, Oberhausen, Germany

[21] Appl. No.: 820,349

[22] Filed: Jul. 29, 1977

Related U.S. Application Data

[63] Continuation of Ser. No. 602,237, Aug. 6, 1975, abandoned.

[30] Foreign Application Priority Data

Aug. 23, 1974 [DE] Fed. Rep. of Germany ....... 2440472

[51] Int. Cl.$^2$ .......................................... B01D 11/04
[52] U.S. Cl. ................................. 210/21; 210/73 W; 210/83
[58] Field of Search ............... 110/31; 210/21, 22, 210/44, 73 W, 83, 322; 366/315; 55/85, 89

[56] References Cited

U.S. PATENT DOCUMENTS

| 2,903,423 | 9/1959 | Monpria et al. | 210/21 |
| 3,148,140 | 9/1964 | Kaiser et al. | 210/21 |
| 3,276,995 | 10/1966 | McDonald, Jr. | 210/21 |
| 3,349,029 | 10/1967 | Cheng | 210/21 |
| 3,917,569 | 11/1975 | Richter et al. | 210/21 |

*Primary Examiner*—Frank A. Spear, Jr.
*Attorney, Agent, or Firm*—Bierman & Bierman

[57] ABSTRACT

A process for the separation of carbon black from liquids containing it is disclosed wherein a particular amount of a liquid hydrocarbon is added to the liquid containing carbon black to form a mixture whereby the carbon black passes into the hydrocarbon phase. The mixture is then passed to a settling zone and the hydrocarbon and carbon black are separated from the liquid by forming a layer thereon. The layer is then passed through a disk centrifuge to substantially separate the carbon black from the hydrocarbon.

5 Claims, 1 Drawing Figure

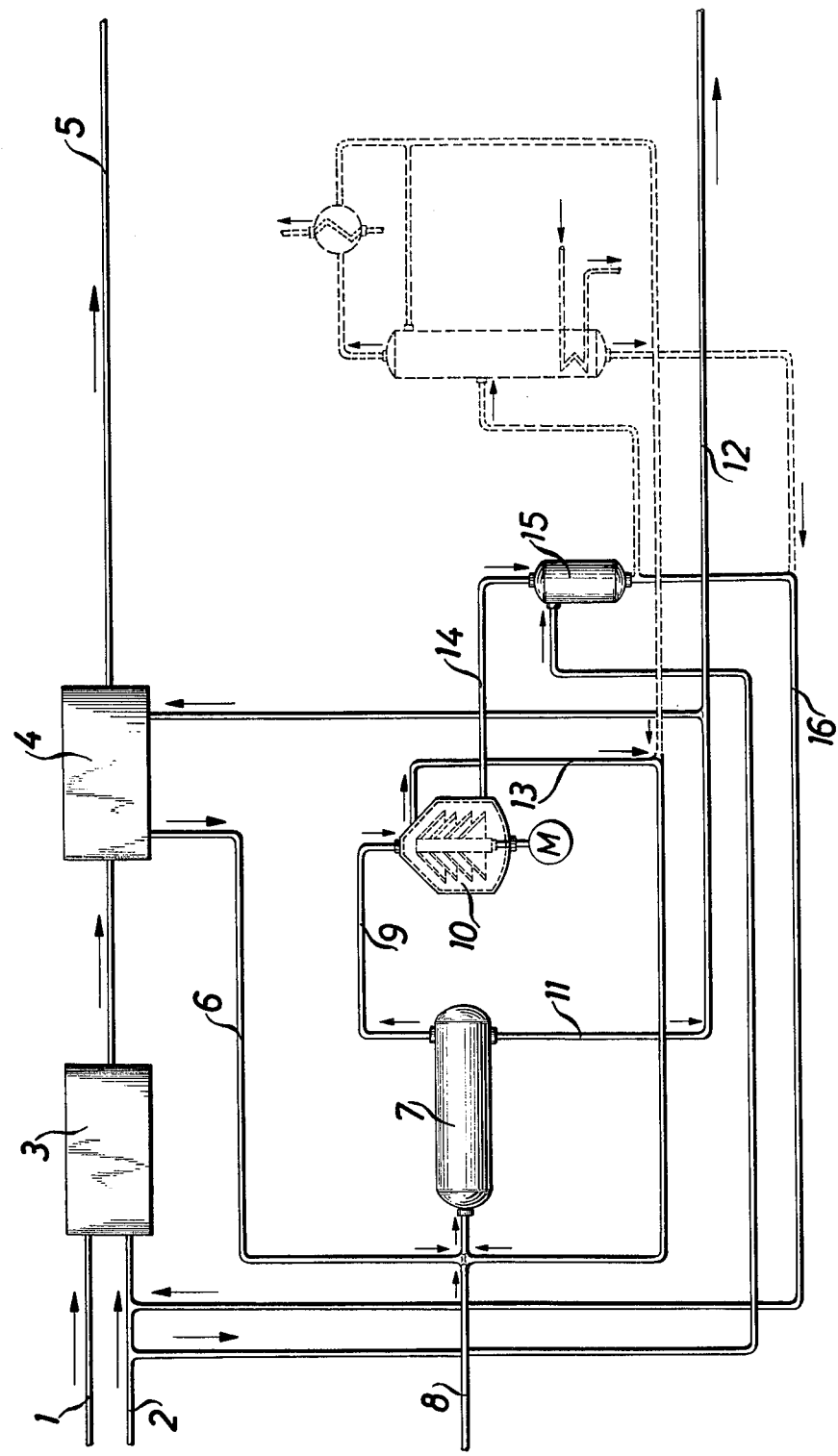

SEPARATION OF CARBON BLACK BY LIQUID HYDROCARBONS

This is a Rule 60 continuation application of Ser. No. 602,237 filed Aug. 6, 1975 now abandoned and which claims the priority of German application No. P 24 40 472 6 filed Aug. 23, 1974.

One very useful source of energy is a product known as synthesis gas. This is an equimolar mixture of carbon monoxide and hydrogen and is produced from petrochemical raw materials. More specifically, any hydrocarbons such as propane, gasoline, liquefied gas, natural gas, and including crude oil, heavy oil, tar and asphalt are reacted with hydrogen under conditions creating incomplete combustion. Usually, these hydrocarbons are reacted with oxygen in an amount which is insufficient for complete combustion in an open flame and in the absence of a catalyst. The reaction is generally carried out at temperatures of approximately 1300° C. and at pressures up to 90 bar. It has been known that pressures can go as high as 160 bar at least in pilot plants.

The products of this reaction include hydrogen sulfide, carbon monoxide, methane, carbon dioxide and hydrogen, all of which are thermodynamically stable under the reaction conditions. Carbon black, although not an equilibrium partner under these conditions, is unavoidably formed. When natural gas is reacted, a minor amount of carbon black is produced. In the case of residual oils, the quantity of carbon black will normally amount to approximately 2 to 4% of the carbon content.

When producing synthesis gas from petrochemical raw materials by processes carried out on a commercial scale, the hydrocarbons and oxygen are separately preheated and introduced into the reactor through one or more burners. The burners may be water-cooled and they permit rapid and intimate mixing of the reactants. The hot gas leaving the reactor (having a temperature of 1400° to 1500° C.) is cooled in a waste heat boiler. Thereafter the carbon black is removed from the raw gas by scrubbing with water. Then the prepurified gas is desulfurized and, if necessary or desired, passed to a carbon monoxide converter. Finally, carbon dioxide, hydrogen sulfide and carbon oxysulfide are largely removed in the gas scrubbing unit downstream of the converter. In certain cases, e.g. if the gas is to be used for synthesis of ammonia, a more complete purification is necessary.

Carbon black can be removed from the raw synthesis gas without any difficulty by simple scrubbing with water. However, problems are encountered when attempting to further utilize the carbon black, especially when returning it into the process, which is desirable for reasons of economy.

In one known process, the total carbon black is returned into the reactor in a closed system. To this end, the carbon black-containing water is mixed in a decanter with naphtha, i.e. a gasoline fraction having a boiling range of about 70° to 112° C. This has the result that the total carbon black passes over into the naphtha phase. After having separated the two phases, water which is free from carbon black is withdrawn from the decanter. The carbon black-containing naphtha is mixed with part of the feed oil and distilled off as the overhead fraction in a distilling column. The oil with the total carbon black remains as bottoms in the column. After being mixed with the remaining feed oil, it is passed to the preheater and thence into the reactor where it is completely gasified.

In another known process, small amounts of feed oil are admixed with the carbon black-containing water. The carbon black passes over into the feed oil phase and, with an appropriately high concentration, forms semi-solid carbon black-oil pellets. The clarified water is separated from the black-oil pellets by means of screens. The clarified water is returned into the process and the carbon black-oil pellets are ground to a slurry with the addition of further feed oil and either passed to a combustion unit or returned into the process as gasification agent.

Both of the known processes of carbon black separation have substantial disadvantages. The separation of carbon black by means of large amounts of naphtha causes the substantial expense of distillation for the recovery of the naphtha, and the separation of carbon black with small amounts of feed oil results in a not inconsiderable pollution of the environment by vapors containing noxious materials. In addition, there are technical difficulties as well.

SUMMARY OF THE INVENTION

Accordingly, it is an object of this invention to provide a process which overcomes the difficulties mentioned above and permits the treatment and processing of carbon black-containing effluent waters in a manner which is satisfactory from both the technical and economical point of view.

In accordance with the invention, carbon black is separated from water (especially from water obtained when scrubbing the synthesis gas produced by partial oxidation of hydrocarbons) by treatment with hydrocarbons. In this process, the carbon black passes over from the aqueous phase into the hydrocarbon phase. The bulk of the hydrocarbons is separated from the resultant suspension of carbon black in hydrocarbon in a disk centrifuge and the remaining carbon black-hydrocarbon mixture is, if desired, distilled in known manner. The carbon black remaining after distillation may be used in usual manner. For example, it may be introduced into the synthesis gas reactor after being mixed with feed oil. However, the carbon black-hydrocarbon suspension may also be used to recover dry carbon black.

It was assumed heretofore when separating carbon black from scrubbing water that it is necessary for the complete extraction of the carbon black from the aqueous phase to use liquid hydrocarbons which are free from carbon black. In this manner, it was desired above all to avoid having very fine carbon black particles remain suspended in the water. Therefore, the hydrocarbons have been separated from the hydrocarbon-black suspensions by distillation. Moreover, the extent and the effect of the mechanical separation of part of the suspension liquid on the economy of the overall process were underestimated.

Surprisingly, it has been found that it is not necessary for treating and processing carbon black-containing water to use hydrocarbons which have been thoroughly purified from small carbon black particles. Rather, it is possible to use hydrocarbons which do contain small carbon black particles. Therefore, it is feasible to separate mechanically the bulk of the hydrocarbons loaded with carbon black after they have been used for the separation of carbon black from water. In accordance with the invention, this is effected with the use of disk centrifuges which ensure sufficient separation of the liquid and solid phases. It is possible in this manner to separate 80 to 90% of the naphtha contained in the suspension.

The naphtha having been separated mechanically can be directly re-used for separating carbon black from suspensions of carbon black and water. From the remaining residue having a concentration of carbon black of 10 to 15% (as compared with about 2% in the original carbon black-hydrocarbon suspension) the carbon black-containing naphtha may, after addition of feed oil in known manner, be distilled off except for small traces. However, a substantially lower expenditure of energy is required to enable it to be used again as a suspending agent. This naphtha is also used again for separating carbon black from suspensions of carbon black and water. The distillation residue is used as feed product in the synthesis gas reactor.

BRIEF DESCRIPTION OF THE DRAWING

The process according to the invention will now be described with reference to the flow sheet attached hereto and described hereinafter in greater detail.

Oxygen and fuel oil are passed through lines 1 and 2 and into a gasification reactor 3. The synthesis gas consisting of carbon monoxide and hydrogen and containing carbon black is freed from this carbon black by means of water in a carbon black scrubber 4. The synthesis gas passes out of the system to further use through line 5. The mixture of carbon black and water is passed through line 6 and into a decanter vessel 7 into which naphtha is simultaneously introduced through line 8. Separation of phases takes place in the decanter vessel 7. The naphtha/carbon black phase leaves the decanter vessel 7 through line 9 while the clarified water is withdrawn through line 11 and returned as recycle water into the carbon black scrubber 4. Excess water leaves the process through line 12. The naphtha-carbon black mixture emerging through line 9 from the decanter vessel is introduced into a disk centrifuge 10 in which separation into a phase enriched with carbon black and a clarified phase takes place. The clarified phase emerging through line 13 (naphtha having a residual content of carbon black of about 0.3%) is returned into the decanter vessel 7. The concentrated phase having a carbon black content of 10 to 15% and leaving the separator 10 through a line 14 is mixed with fuel oil in a mixer 15 and passed through line 16 and into the gasification reactor 3. The mixture of naphtha and feed oil withdrawn from the mixer 15 may be subsequently distilled to recover pure naphtha.

DESCRIPTION OF THE PREFERRED EMBODIMENT

EXAMPLE

The test was performed with a disk centrifuge which had the following characteristics:

disk diameter — 160 mm
number of disks — 37
distance between the disks — 0,5 mm
diameter of the separation layer — approx. 125 mm
rate of revolutions — 9500 revolutions per minute
centrifugal acceleration — 5000–6000 acceleration due to gravity 300 liter per hour of a mixture coming from the carbon black separation consisting of naphtha, and carbon black (with a carbon black charge of 20 gram carbon black per liter naphtha) and residual water with a temperature of 80° C were introduced into the disk centrifuge by pipe 9. During the test, which lasted two hours, the quantity per time unit of the introduced liquid (290 to 300 liter per hour) and the quantity per time unit of the clarified liquid from pipe 13 (215–225 liter per hour) were measured continuously. The quantity of concentrated carbon black sludge was determined by collecting in a receiver and found to be 75 liter per hour on an average. Samples of the sludge and the clarified liquid were collected regularly at 15 min. intervals and analysed. The analysis of all samples showed that the concentration of solids in the carbon black sludge was in the range of 70 to 85 gram carbon black per liter naphtha. A residual amount of solid between 0.2 and 0.8 gram carbon black per liter naphtha was found in the clarified liquid. The mechanically separated naptha could be reintroduced immediately to the separation of carbon black from the carbon black-water suspension.

What is claimed is:
1. A process for separating carbon black from a liquid containing it comprising
   a. adding 20 to 100 parts of a liquid hydrocarbon per part of carbon black to said liquid to form a first mixture and whereby said carbon black passes into the hydrocarbon phase,
   b. passing said first mixture into a settling zone,
   c. separating said hydrocarbon and carbon black from said liquid by the method comprising
      1. permitting said hydrocarbon and carbon black to form a layer upon the surface of said liquid,
   d. passing said layer through a disk centrifuge having a plurality of conical disks.
2. The process according to claim 1 wherein said hydrocarbon is petroleum naphtha.
3. The process according to claim 1 wherein said hydrocarbon is initially not free from carbon black.
4. The process of claim 1 wherein the step of passing said layer through said disk centrifuge further comprises, separating said layer into the bulk of said hydrocarbon and a second mixture containing the remainder of said hydrocarbon and carbon black, recycling said bulk of said hydrocarbon to contact said liquid containing said carbon black, and distilling said second mixture to remove substantially all of said hydrocarbon from said carbon black.
5. The process of claim 1 wherein said liquid is water.

* * * * *